(12) United States Patent
Hirschfeld et al.

(10) Patent No.: US 9,967,326 B2
(45) Date of Patent: May 8, 2018

(54) INFORMATION HANDLING SYSTEM APPLICATION DECENTRALIZED WORKLOAD MANAGEMENT

(71) Applicant: Dell Products L.P., Round Rock, TX (US)

(72) Inventors: Robert Ari Hirschfeld, Rollingwood, TX (US); Gregory Scott Althaus, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days. days.

(21) Appl. No.: 14/940,481

(22) Filed: Nov. 13, 2015

(65) Prior Publication Data

US 2016/0072877 A1  Mar. 10, 2016

Related U.S. Application Data

(63) Continuation of application No. 13/079,170, filed on Apr. 4, 2011, now Pat. No. 9,195,510.

(51) Int. Cl.
*G06F 15/16* (2006.01)
*H04L 29/08* (2006.01)
*G06F 9/50* (2006.01)

(52) U.S. Cl.
CPC ............ *H04L 67/10* (2013.01); *G06F 9/5044* (2013.01); *G06F 9/5072* (2013.01); *G06F 9/5077* (2013.01)

(58) Field of Classification Search
CPC ...................................................... H04L 67/10

USPC ......................................................... 709/217
See application file for complete search history.

(56) References Cited

U.S. PATENT DOCUMENTS

| | | | |
|---|---|---|---|
| 8,046,767 B2 | 10/2011 | Rolia et al. | |
| 8,175,863 B1 | 5/2012 | Ostermeyer et al. | |
| 8,291,416 B2 | 10/2012 | Cartales | |
| 8,601,471 B2 | 12/2013 | Beaty et al. | |
| 2007/0043860 A1 | 2/2007 | Pabari | |
| 2010/0191854 A1 | 7/2010 | Isci et al. | |
| 2010/0211958 A1 | 8/2010 | Madison et al. | |
| 2010/0217454 A1 | 8/2010 | Spiers et al. | |
| 2010/0269109 A1 | 10/2010 | Cartales | |
| 2011/0010339 A1 | 1/2011 | Wipfel et al. | |
| 2011/0016214 A1 | 1/2011 | Jackson | |
| 2011/0022812 A1 | 1/2011 | van der Linden et al. | |
| 2011/0107332 A1 | 5/2011 | Bash | |
| 2011/0113273 A1 | 5/2011 | Okitsu et al. | |
| 2011/0225277 A1 | 9/2011 | Freimuth et al. | |
| 2011/0276951 A1* | 11/2011 | Jain .................... | G06F 11/3006 717/140 |

(Continued)

*Primary Examiner* — Karen Tang
(74) *Attorney, Agent, or Firm* — Terrile, Cannatti, Chambers & Holland, LLP; Robert W. Holland

(57) ABSTRACT

A cloud application management infrastructure models biological swarm behaviors to assign application resources to physical processing resources in a decentralized manner. A balanced and highly automated management of cloud infrastructure has a predictable and reliable response to changing resource loads by using a limited local rule set to define how application instances interact with available resources. Digital pheromone signals at physical resources are applied locally by a swarm module to determine if the physical resources provide an acceptable environment for an application and, if not, the application swarms to other environments until a suitable environment is found.

19 Claims, 4 Drawing Sheets

(56) References Cited

U.S. PATENT DOCUMENTS

| | | |
|---|---|---|
| 2011/0320556 A1 | 12/2011 | Reuther |
| 2012/0054329 A1 | 3/2012 | Gulati et al. |
| 2012/0066487 A1 | 3/2012 | Brown et al. |
| 2012/0089726 A1 | 4/2012 | Doddavula |
| 2012/0151276 A1 | 6/2012 | Bjorner et al. |
| 2012/0198253 A1 | 8/2012 | Kato et al. |
| 2012/0233668 A1 | 9/2012 | Leafe et al. |
| 2012/0284713 A1 * | 11/2012 | Ostermeyer ........ G06F 17/5009 718/1 |
| 2013/0042123 A1 | 2/2013 | Smith et al. |
| 2013/0060919 A1 | 3/2013 | Khandekar et al. |
| 2013/0061014 A1 | 3/2013 | Prahlad et al. |
| 2013/0218547 A1 | 8/2013 | Ostermeyer et al. |
| 2013/0254768 A1 | 9/2013 | Wipfel et al. |

* cited by examiner

INFORMATION HANDLING SYSTEM APPLICATION DECENTRALIZED WORKLOAD MANAGEMENT

CONTINUING DATA

This application is a continuation of U.S. patent application Ser. No. 13/079,170, filed Apr. 4, 2011, now U.S. Pat. No. 9,195,510, issued Nov. 24, 2015, which is incorporated herein by reference in its entirety.

BACKGROUND OF THE INVENTION

Field of the Invention

The present invention relates in general to the field of information handling system resource management, and more particularly to information handling decentralized workload management.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems have grown in processing capability, the number and difficulty of tasks assigned to a given information handling system have increased. Indeed, with the introduction of virtualization, a single information handling system hardware platform can support a multitude of virtual information handling systems platforms, each virtual information handling system platform running applications on its own operating system. In a "cloud" architecture, multiple hardware platforms interfaced through a network provide physical resources to support multiple virtual platforms. The hardware platforms perform virtualized tasks under the direction and control of an application management infrastructure (AMI). As hardware platforms in the cloud face varying degrees of utilization, the AMI attempts to spread out tasks so that hardware platform resources handle processing tasks in an efficient manner. Bottlenecks that occur at hardware platforms or the network resources that provide communication between hardware platforms can reduce cloud effectiveness by leaving valuable resources temporarily unusable.

Cloud AMIs tend to have complex and difficult to scale software architectures that use out-of-band infrastructure and inject dependancies that reduce the fault tolerance of the overall system. For example, the management systems for a platform as a service (PaaS) application framework requires dedicated hardware resources, communication resources and overlay code, each of which presents a potential critical fault in the event of system failures. Such management systems are inherently master-slave configurations having a management system that actively monitors and adjusts resource utilization. As a consequence, performance and logic limitations in the management system limit the application's ability to operate. In essence, a master-slave AMI cannot effectively scale resources required for management and performance overhead with application load. A lack of efficiency in dealing with overhead results in application responses that are sometimes slow and unreliable. Some cloud technologies, such as Google App Engine and Heroku, attempt to increase management resource efficiency by using code containment with various types of governance models. Network management technologies, such as Zeus and other load balancers attempt to increase network traffic flow management efficiency, however, load balancers are not integrated with the underlying creation of workloads and therefore add to management complexity. Some cloud platforms attempt to integrate load balancer and virtual machine instance creation with limited success.

SUMMARY OF THE INVENTION

Therefore a need has arisen for a system and method which supports a cloud application management infrastructure that scales linearly in resource use with application load for improved application response and reliability.

In accordance with the present invention, a system and method are provided which substantially reduce the disadvantages and problems associated with previous methods and systems for managing applications in a cloud. Decentralized management of application instances in a cloud of processing resources is accomplished with an agent associated with each application instance executing locally at a processing resource. The agent applies local rules to an environment defined at the processing resource to individually manage application instances with a cumulative effect that mimics emergent behavior.

More specifically, plural processing resources interact through a cloud network infrastructure to execute applications in response to requests by clients of the cloud. For example, applications are containers that execute on host information handling systems, such as virtual machines. The selection of the processing resource to support a particular container is managed by a swarm module associated with the container, which selects the processing resource based upon the environment at the processing resource as defined by pheromone signals stored at the processing resource, or pheromone factors of proximate resources. Pheromones in this context are digital signals used for communication loosely based on biological pheromones. The swarm modules model emergent behavior by alerting a processing resource of the presence of the container with an alteration of the environment at the processing resources as reflected by the pheromone signals stored at the processing resource. The swarm module establishes the container at a processing resource in response to the environment at the processing resource and moves the container if needed due to changes in the processing resource environment or changes at proximate resources.

The present invention provides a number of important technical advantages. One example of an important technical advantage is that a cloud application management architecture scales linearly in resources required and performance overhead with the application load. A biological emergence model for a cloud AMI provides an efficient, concrete and predictable rules-based management of hardware and software resources to enable rapid and reliable application response. It also better accommodates non-homogeneous resource environments because local decision making tunes for specific resource capability. Application-based decentralized management creates independently-acting entities that act with greater overall intelligence than any individual entity has. This phenomena is known as emergent behavior and it the expected result of the concepts embodied in this invention. Decentralized management avoids bottlenecks that create weak points of system failure with simple and predictable responses to changes in application workload for a balanced and highly automated allocation of resources. An emergent behavior model better balances different workloads without understanding the nature of the workload, thereby providing opaque resource balancing.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
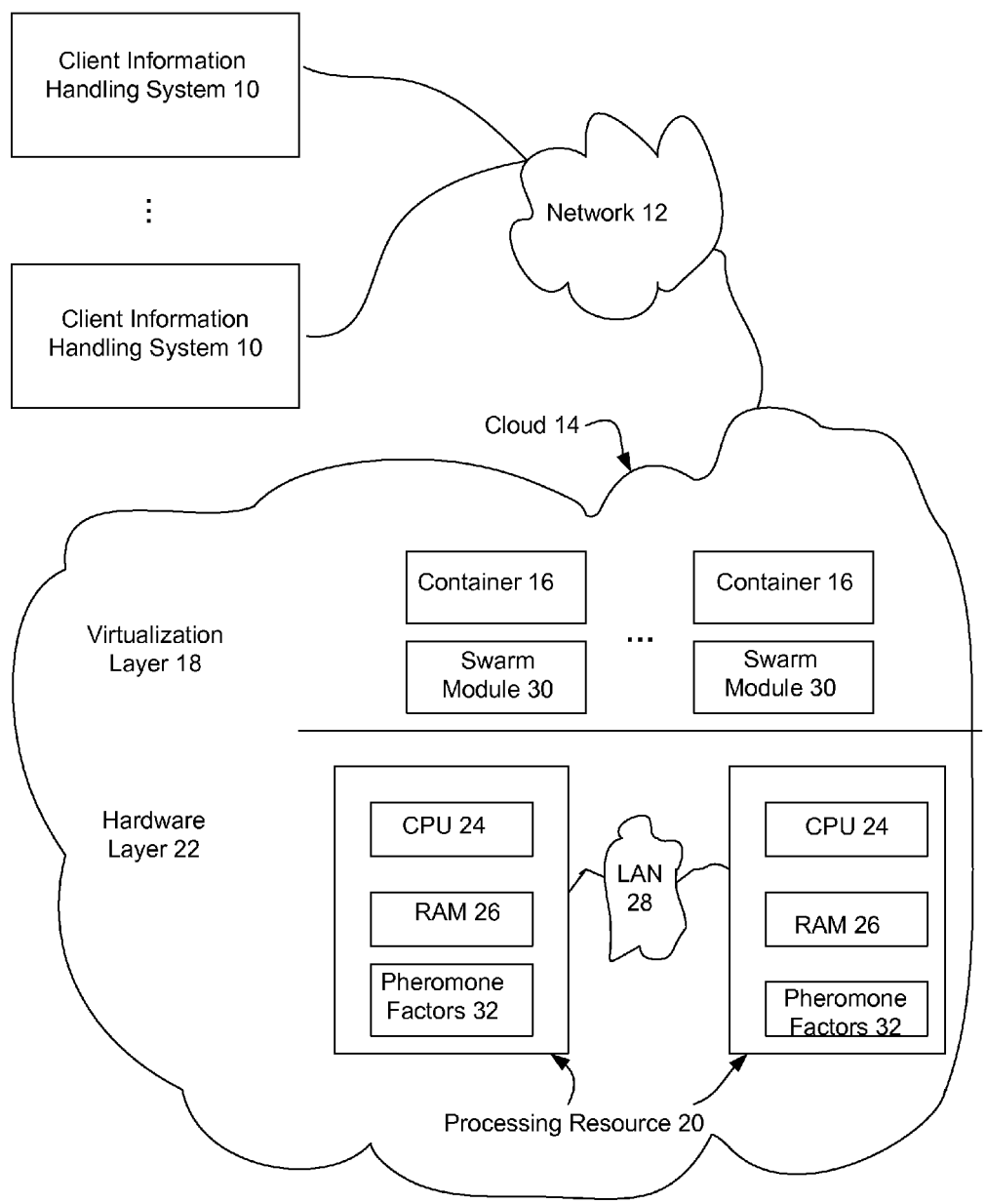
FIG. 1 depicts a block diagram of a cloud application management infrastructure for decentralized assignments of application instances to processing resources.

Referring now to FIG. 1, a block diagram depicts a cloud application management infrastructure for decentralized assignments of application instances to processing resources. Client information handling systems 10 interface through a network 12, such as the Internet, with virtualized processing resources disposed in a cloud 14. The virtualized processing resources are containers 16 disposed in a virtualization layer 18 that runs on processing resources 20 disposed in a hardware layer 22. For example, each container 16 is a virtual machine having an operating system and plural applications that perform work for clients 10 and each processing resource 20 is a host information handling system having a CPU 24 and memory 26 to execute the containers 16. Processing resources 20 communicate through a network 28, such as a local area network, so that containers 16 can selectively execute on any of the processing resources 20 by re-locating through network 28. In alternative embodiments, processing resources may communicate through alternative networks, such as wide area networks or the Internet.

In order to manage the physical processing resource 20 selected to run a given container 16, decentralized management is provided with a swarm module 30 associated with each container 22 and by reference to pheromone signals 32 associated with each processing resource 20. Swarm module 30 provides a cloud application management infrastructure modeled on biological swarm behaviors using an environment defined at each processing resource 20 using pheromone signals 32. In the swarm model, each container application resource is managed using local rule sets that describe how local application instances interact with available physical resources and other proximate application instances to create emergent behavior. Emergent behavior describes the effect created when independently acting entities appear to act as a whole with greater intelligence than independent components possess. Emergent behavior is often observed in nature, and as applied to a cloud application management infrastructure herein helps to maximize limited resources, create failure resilient systems, respond quickly to change and decentralize control. A decentralized emergent behavior control system establishes and moves containers 16 with highly automated swarms having simple and predictable actions defined by pheromone signals 32 in response to changes in resource loads or applications providing services on the processing resource 20. Pheromone signals 32 define an environment that mirrors available resources by having pheromones defined by each container 16 for its associated processing resource 20 in addition to pheromones defined specifically for a processing resource 20. Pheromone signals 32 are signals shared between resource managers of containers using those resources. Containers may monitor both specific and general pheromone factors 32 on local and proximate computing resources 20.

In one embodiment, local rules include proximity for determining processing resource allocation with swarms. Proximity is a logical concept that allows for resource distribution by weighting the relative impact of pheromone signals sensed at a processing resource supporting a swarm module and other than the processing resource supporting a swarm module. Local pheromone signals are those that are most proximate in that local pheromone signals are generated under the direct control of the processing resource that supports a swarm module. Proximate pheromone signals are those generated under the control of a processing resource that interfaces with the swarm module's processing resource through a low latency network interface. Remote pheromone signals are those generated under the control of a processing resource that is available to the swarm module's processing resource through networking that is less responsive than proximate resources, such as through an Internet interface instead of a local area network interface. Proximity definitions may vary by the type of environment involved. In one embodiment the number of processing resources considered proximate is bounded to not exceed 20% of total addressable processing resources. Each processing resource may have a unique set of proximate processing resources based on the system topology or similar model. Different pheromone signals may have different proximity settings. A pheromone signal is a generally available system wide communication token that uniquely identifies an application but is also shared and understood by other applications and processing resources at any distance. Proximity provides the concept of concentration gradients to pheromone signals similar to the biological concept that a pheromone signal strength decreases with distance. Processing resources that interpret pheromone signals can apply concentration gradients to judge relative distances between themselves and other processing resources for improved distribution of workload through a cloud.

Figure 2:
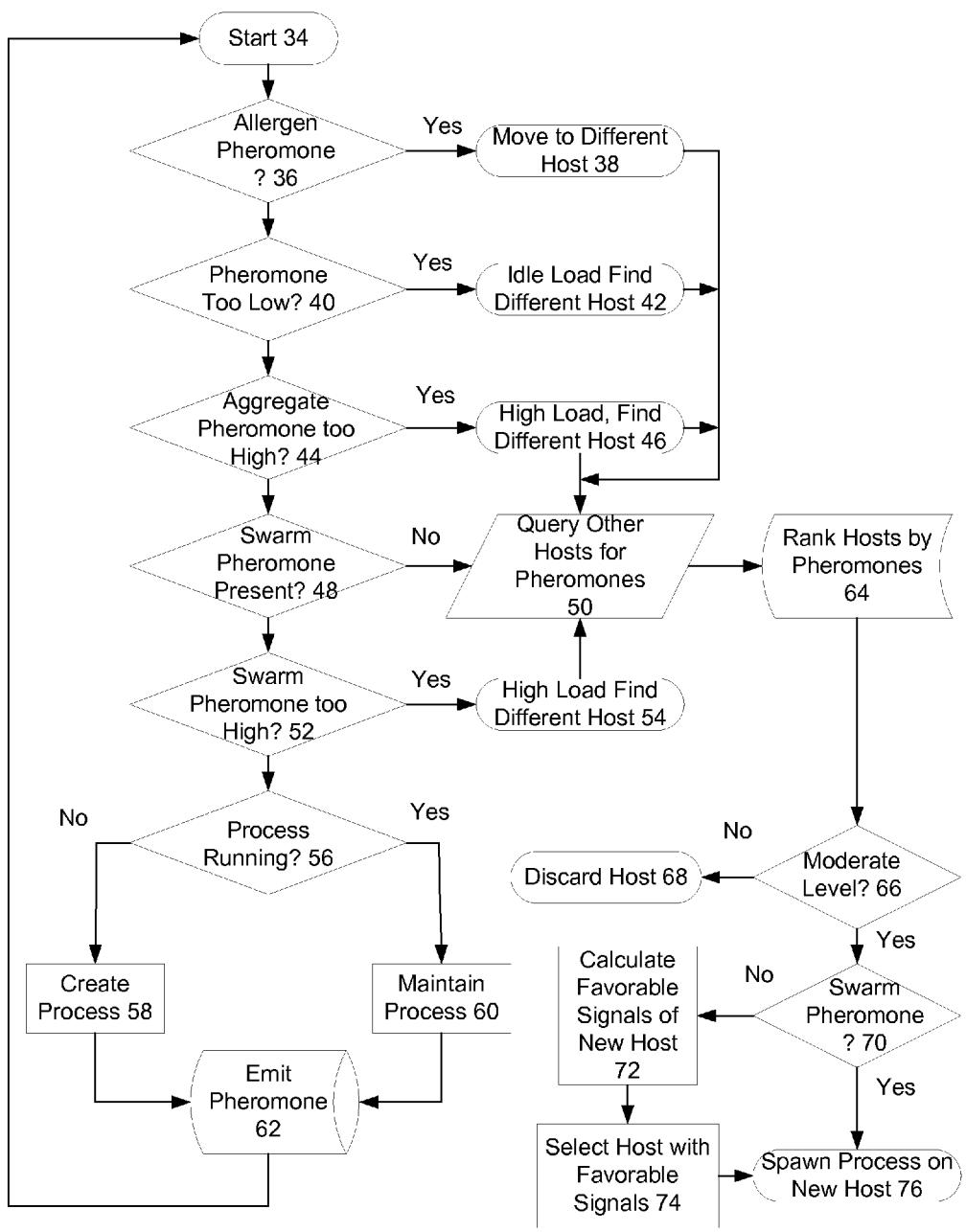
FIG. 2 depicts a flow diagram of a process for creation of a swarm within a cloud.

Referring now to FIG. 2, a flow diagram depicts a process for creation of a swarm within a cloud. The process starts at step 34 by initiating a swarm module of a container at a processing resource, such as when a client initiates a virtual machine or an application running on a virtual machine in the cloud. At step 36, the swarm module of the container executes on the processing resource and checks pheromone signals of the processing resource for any allergen pheromones, such as would indicate that the execution of the container on the processing resource is not permitted. If an allergen is detected, the process continues to step 38 to move the container to a different host processing resource. At step 40, the swarm module checks an aggregate of pheromone signals at the processing resource to determine if the aggregate value is less than a predetermined value. If the aggregate value is too low, such as might exist at a host in an energy saving mode, the process continues to step 42 to move to a different host processing resource. At step 44, the swarm module checks the aggregate of pheromone signals at the processing resource to determine if the aggregate value is greater than a predetermined value. If the aggregate value is too great, such as might exist at a host with too great a load, the process continues to step 46 to move to a different host processing resource. At step 48, the swarm module checks for a swarm pheromone associated with the container to verify that the container is authorized to execute on the processing resource. If no swarm pheromone is detected, the process continues to step 50 to move to a host processing resource authorized to execute the container. At step 52, if the swarm pheromone is present, the swarm module checks the aggregate level of swarm pheromone to determine if the aggregate level exceeds a maximum value, such as might occur if the number of containers executing on the processing resource and associated with the swarm is greater than a desired amount. If the aggregate swarm value is too great, the process continues to step 54 to move to a different host. At step 56, conditions precedent for executing the container are met and a determination is made at step 56 of whether the container process is executing on the processing resource. If yes, the process continues to step 60 to maintain the process and step 62 to emit a pheromone. If no, the process continues to step 58 to create the process and step 62 to emit a pheromone. The pheromone emitted at step 62 is stored at the processing resource as an indicator of the impact on the processing environment of the container performing work at the processing resource. Emitting pheromones increases the concentration of both instance specific and aggregate pheromones. In one embodiment, swarms differentiate their own pheromone concentration, that of other swarms, and the overall pheromone level. These levels indicate the overall resource load at a computing resource 20 and of proximate resources.

At step 50, a determination has been made by the swarm module to move through the cloud network to a different host processing resource so a query is made by the swarm module as to the pheromone signals of other host processing resources. At step 64, the swarm module analyzes the pheromone signals retrieved or received from other host processing resources such as by searching for the aggregate pheromone level at other host processing resources. In one embodiment, the analysis includes proximity of the other host processing resources to order the host processing resources. Proximity ratings for each host processing resource adjusts the weight for ordering the nodes. For example, a static function is applied to the queried results, or a propagating system that handles changes in single pheromone strengths is received so that lookups are local instead of remote. At step 66, a determination is made of the host processing resources that have moderate aggregate levels of pheromones, which indicates that the host processing resources are not overloaded or under loaded. At step 68, processing resources that have too high or too low of an aggregate level of pheromones are discarded. At step 70, a determination is made of whether a swarm pheromone is present at the other hosts. If not, the process continues to step 72 to calculate the distance cost for the other host processing resources and at step 74 the host processing resource is selected that has the most favorable environmental factors. For example, favorable environmental factors may be indicated by pheromone signals on the computing resource 20 or by other algorithms, such as cost, distance, reliability and performance. At step 76, the container is spawned at the selected host processing resource that has the spawn pheromone or that has the least cost associated with initiating the container.

Figure 3:
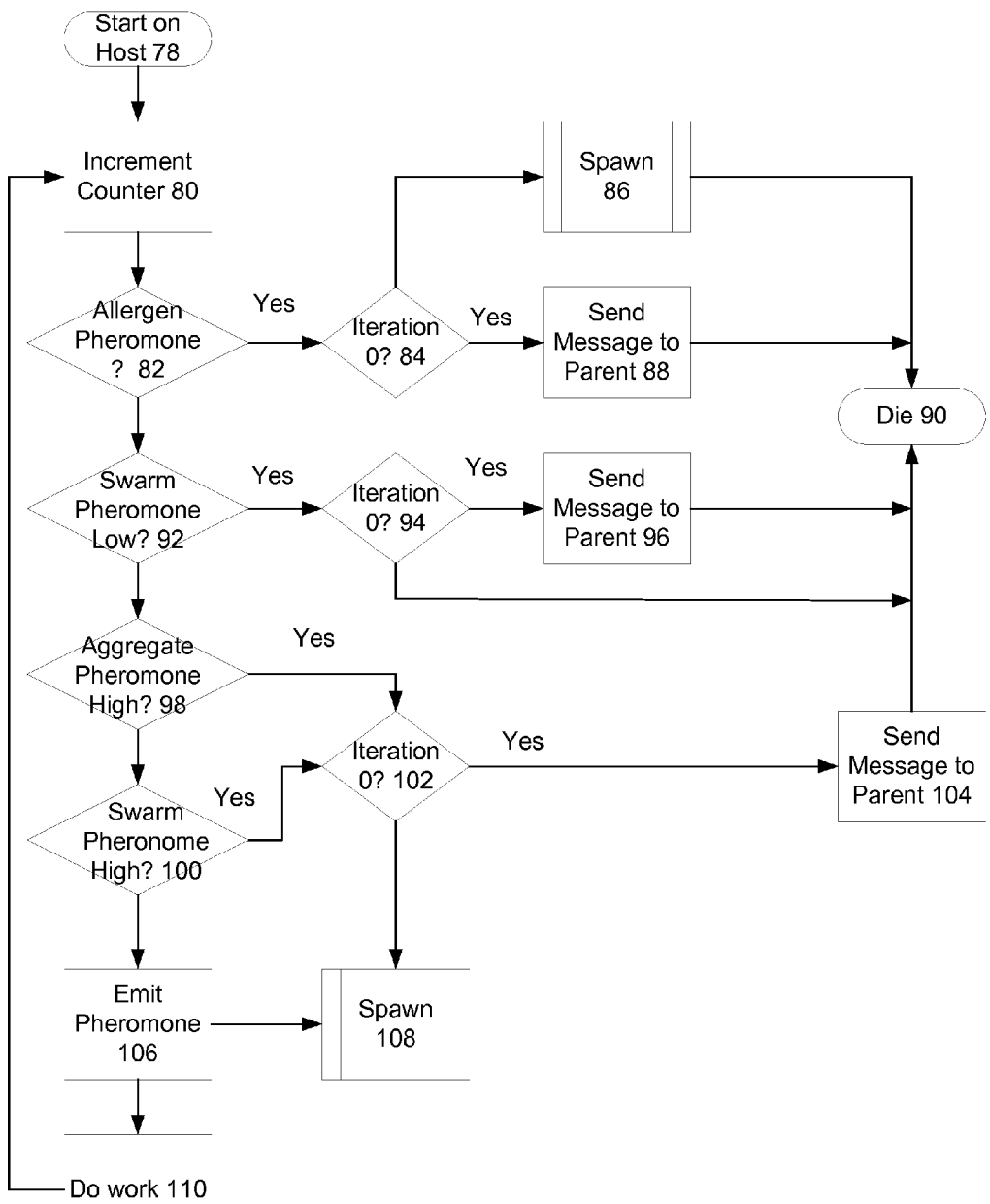
FIG. 3 depicts a flow diagram of local decisions made during a swarm creation.

Referring now to FIG. 3, a flow diagram depicts local decisions made during a swarm creation, such as with a swarm module established at processing resource to move a container from a different processing resource. The process begins at step 78 with parameter functions established at the swarm module of a timer duration, a swarm pheromone level too high, a swarm pheromone level too low, an aggregate pheromone level too low or an aggregate pheromone level too high. At step 80 a counter is incremented from a value of zero each time a timer reaches a predetermined count. At step 82 a determination is made of whether an allergen pheromone is present which indicates a hostile environment for the container associated with the swarm module and running on the processing resource. If an allergen is present, the process continues to step 84 to determine if this is a first iteration and, if not, the process continues to step 86 to spawn the container to a different host processing resource and then step 90 to terminate (aka die) at the current processing resource. If at step 84, the process is a first iteration the process continues to step 88 to send a message to the parent swarm module and dies at step 90. If at step 82 an allergen is not present, the process continues to step 92 to determine if the swarm pheromone is too low, which indicates an idle container at the processing resource. If the swarm pheromone is too low, the process continues to step 94 to determine if it is a first iteration. If a first iteration, the process continues to step 96 to send a message to the parent swarm module and dies at step 90. If not a first iteration, the process dies at step 90.

At step 98 a determination is made of whether the aggregate pheromone level at the processing resource is too high, which indicates to heavy of a workload. If the aggregate pheromone level is too high, the process continues to step 102 to determine if it is a first iteration. If a first iteration, the process continues to step 104 to send a message to the parent spawn module and dies at step 90. If not a first iteration, the process continues to step 108 to spawn to a different processing resource. If a spawn occurs at step 108, the spawn initiates with the function parameters passed from the parent and proceeds to the next host on the list of target host processing resources. If at step 98 the aggregate pheromone level is not too high, the process continues to step 100 to determine if the swarm pheromone level is too high, which indicates that the processing resource is too concentrated with the type of container at issue. If the swarm pheromone is too high, the process continues to step 102 and then to step 104 if the first iteration or to step 108 if not the first iteration. If the swarm pheromone level is not too high, the process continues to step 106 to emit a pheromone and either spawn at step 108 or do work at step 110, based upon the container's underlying purpose. At the end of the timer, the process returns to step 80 to repeat the process of determining whether to remain on the processing resource or move to a different processing resource.

Figure 4:
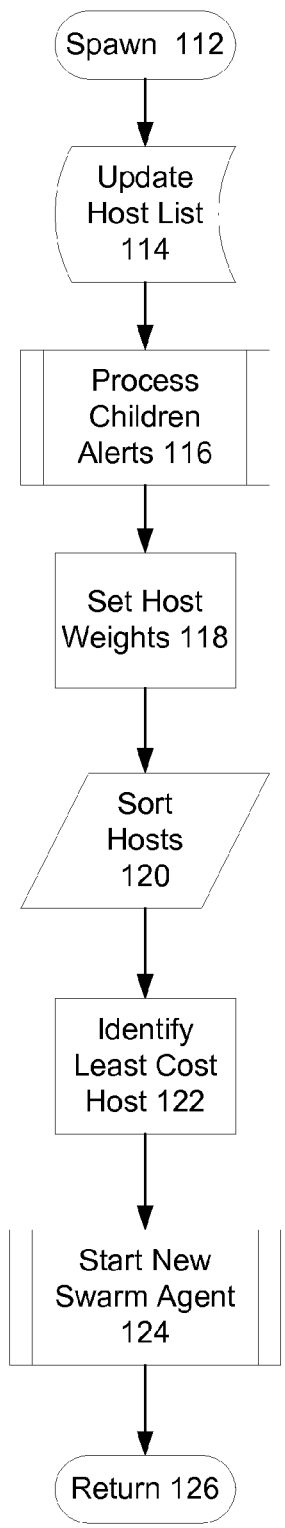
FIG. 4 depicts a flow diagram of a process for spawning a container.

Referring now to FIG. 4, a flow diagram depicts a process for spawning a container. The process begins at step 112 with a spawn to initiate a container at a processing resource. At step 114, the known host processing resource list is updated to add new hosts and remove old hosts. At step 116, children alerts sent to the spawn module are processed, such as attempts to spawn at processing resources that failed. At step 118, host processing resource weights are set to reflect the desirability of host processing resources for supporting a spawn of a container. For example, the relative attractiveness of each host processing resource is adjusted as a function of network distance, a time weight, a delay in selection of a host and child deaths. At step 120, the host processing resources are sorted by weights and at step 122 the host processing resource having the least cost is identified. At step 124 a swarm agent is generated to run on the proposed host processing resource to determine the host processing resource's suitability to support the associated container, such as is depicted by FIG. 3.

Although the present invention has been described in detail, it should be understood that various changes, substitutions and alterations can be made hereto without departing from the spirit and scope of the invention as defined by the appended claims.

What is claimed is:

1. A system comprising:
    plural information handling systems interfaced by a network, each information handling system having processing resources configured to run plural virtual machines;
    plural virtual machines executing on each of the information handling system;
    a list stored on each information handling system, the list defining a processing environment with one or more factors at the information handling system; and
    plural agents, each agent assigned to a distinct virtual machine, each virtual machine having a distinct agent, each agent operable to retrieve the processing environment from the lists of the plural information handling systems through the network and to determine in a decentralized manner locally at the agent's information handling system a selected of the plural processing resources for executing the virtual machine, each agent further operable to write one or more processing environment factors to the list of the agent's information handling system;
    wherein each agent determines an information handling system on which to execute the agent's associated virtual machine at least in part by monitoring reports of failures by virtual machines to start at the plural information handling systems, weighting desirability of the plural information handling system resources and sorting the weights to select one of the plural information handling systems having a least cost.

2. The information handling system of claim 1 wherein the list comprises an allergen factor, the agent responding to the presence of an allergen factor in the list by moving the virtual machine to a different processing resource.

3. The information handling system of claim 1 wherein the list comprises an aggregate value, the agent responding to an aggregation value of greater than a predetermined value by moving the virtual machine to a different processing resource.

4. The information handling system of claim 1 wherein the list comprises an aggregate value, the agent responding to an aggregation value of less than a predetermined value by moving the virtual machine to a different processing resource.

5. The information handling system of claim 1 wherein the list comprises a pheromone factor associated with a predetermined type of virtual machine, the agent responding to the lack of the pheromone factor in the list by moving the virtual machine to a different processing resource.

6. The information handling system of claim 1 wherein the agent responds to an aggregate value of the pheromone factor in the list of greater than a predetermined valued by moving the virtual machine to a different processing resource.

7. The information handling system of claim 1 wherein each virtual machine generates one or more predetermined pheromone factors to add to the list of the processing resource that executes the virtual machine.

8. The information handling system of claim 7 wherein each virtual machine comprises plural applications, each application generating one or more predetermined pheromone factors.

9. A method for decentralized assignment of each of plural virtual machines to each of plural processing resources interfaced through a network, the method comprising:
    listing factors at each of the plural processing resources of the virtual machines running on the processing resource;
    evaluating the factors listed at each of the processing resources with an agent distinctly assigned to each virtual machine, the agent determining in a decentralized manner whether to execute the virtual machine at the processing resource or to move the virtual machine through the network to a different processing resource, each agent retrieving through the network the factors of the plural processing resources to apply to determine movement of the virtual machine from the agent's processing resource, the factors including at least:
    alerts received from other virtual machines of failed initiations at processing resources;
    a list of available processing resources;
    weights assigned by the agent for each processing resource of the list;
    a sorted list of the weights; and
    identification from the list of a least cost processing resource to initiate the virtual machine.

10. The method of claim 9 wherein the factor comprises an allergen, the method further comprising:
determining the allergen applies to the virtual machine; and
moving the virtual machine to a different processing resource in response to the determining.

11. The method of claim 9 wherein the factor comprises an aggregate of factors having less than a predetermined value, the method further comprising:
determining the aggregate applies to the virtual machine; and
moving the virtual machine to a different processing resource in response to the determining.

12. The method of claim 9 wherein the factor comprises an aggregate of factors having greater than a predetermined value, the method further comprising:
determining the aggregate applies to the virtual machine; and
moving the virtual machine to a different processing resource in response to the determining.

13. The method of claim 9 further comprising:
searching for a predetermined factor stored at the processing resource;
failing to locate the factor at the processing resource; and
responding to the failing by moving the virtual machine from the processing resource through the network to another of the processing resources having the predetermined factor.

14. The method of claim 9 further comprising:
searching for a predetermined factor at the processing resource;
locating the predetermined factor at the processing resource; and
responding to the locating by initiating the virtual machine at the processing resource.

15. The method of claim 14 further comprising:
determining that the predetermined factor has an aggregate greater than a predetermined value; and
responding to the determining by moving the virtual machine from the processing resource through the network to a different processing resource.

16. The method of claim 9 further comprising:
executing the virtual machine at the processing resource; and
in response to the executing, adding a factor associated with the container to the listing of factors.

17. A system for allocating a virtual machine to a processing resource of plural processing resources interfaced through a network, the system comprising:
non-transitory memory storing instructions including:
a list of environment factors at each processing resource, the environment factors defining an operating environment for each processing resource;
an agent distinct to each virtual machine and operable to analyze the environment factors of a processing resource to authorize or reject execution of the virtual machine at the processing resource, the agent further operable to retrieve the environment factors of distal processing resources to determine a processing resource to authorize execution of the virtual machine if the agent rejects the processing resource, the environment factors including at least reports sent through the network of failed initiations of virtual machines at processing resources by agents at the processing resources, the environment factors applied at the agent to sort processing resources by cost, the agent selecting a processing resource to initiate the virtual machine based upon the cost.

18. The system of claim 17 wherein the environment factors comprise an allergen, the agent automatically rejecting execution of the virtual machine at the processing resource.

19. The system of claim 17 wherein the environment factors comprise a pheromone, the agent automatically rejecting the execution of the container at the processing resource in the absence of the pheromone.

* * * * *